(12) United States Patent
Lee et al.

(10) Patent No.: US 11,755,257 B2
(45) Date of Patent: Sep. 12, 2023

(54) AUTOMATIC OUTPUT OF DOCUMENT

(71) Applicant: HEWLETT-PACKARD DEVELOPMENT COMPANY, L.P., Spring, TX (US)

(72) Inventors: Myoungjin Lee, Seongnam-si (KR); Inhwan Cha, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/762,475

(22) PCT Filed: Jun. 26, 2020

(86) PCT No.: PCT/US2020/039838
§ 371 (c)(1),
(2) Date: Mar. 22, 2022

(87) PCT Pub. No.: WO2021/141624
PCT Pub. Date: Jul. 15, 2021

(65) Prior Publication Data
US 2022/0365732 A1    Nov. 17, 2022

(30) Foreign Application Priority Data
Jan. 6, 2020   (KR) .......................... 10-2020-0001341

(51) Int. Cl.
*G06F 3/12* (2006.01)
*H04L 67/06* (2022.01)

(52) U.S. Cl.
CPC .......... *G06F 3/1204* (2013.01); *G06F 3/1236* (2013.01); *G06F 3/1268* (2013.01); *G06F 3/1287* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 8,643,856 B2 | 2/2014 | Nuggehalli et al. | |
| 10,180,814 B2 | 1/2019 | Fujii | |
| 10,187,549 B2 | 1/2019 | Zehler et al. | |
| 10,310,776 B2 | 6/2019 | Liao | |
| 2009/0225345 A1* | 9/2009 | Shimmoto | G06F 3/1208 358/1.13 |

(Continued)

FOREIGN PATENT DOCUMENTS

| | | |
|---|---|---|
| CN | 102387279 A | 3/2012 |
| CN | 106254709 A | 12/2016 |

(Continued)

*Primary Examiner* — Frantz Bataille
(74) *Attorney, Agent, or Firm* — Brooks, Cameron & Huebsch, PLLC

(57) ABSTRACT

An example image forming apparatus includes a communication interface device, a print engine, a processor, and a memory that stores instructions executable by the processor. The processor may execute the instructions, as an automatic document output function is performed, to detect access of a user terminal through the communication interface device, based on detecting the access of the user terminal, obtain a document to be automatically output using setting information of the automatic document output function, and output the obtained document by using the print engine.

16 Claims, 10 Drawing Sheets

(56) References Cited

U.S. PATENT DOCUMENTS

| | | | |
|---|---|---|---|
| 2011/0188063 A1 | 8/2011 | Nuggehalli et al. | |
| 2012/0050793 A1 | 3/2012 | Miyazawa | |
| 2013/0141746 A1 | 6/2013 | Miller et al. | |
| 2013/0265602 A1* | 10/2013 | Mykins | G06F 3/1222 358/1.14 |
| 2016/0364192 A1 | 12/2016 | Fujii | |
| 2018/0081467 A1 | 3/2018 | Jiang et al. | |
| 2020/0137242 A1* | 4/2020 | Maeda | G06F 3/1222 |
| 2020/0142656 A1 | 5/2020 | Seo et al. | |

FOREIGN PATENT DOCUMENTS

| | | |
|---|---|---|
| CN | 107239418 A | 10/2017 |
| CN | 107466390 A | 12/2017 |
| CN | 110506253 A | 11/2019 |
| JP | 2012-208886 A | 10/2012 |
| JP | 2017-10329 A | 1/2017 |
| KR | 10-2011-0029435 A | 3/2011 |
| KR | 10-2014-0142093 A | 12/2014 |
| WO | WO-2018/236136 A1 | 12/2018 |

\* cited by examiner

FIG. 6

```
SET AUTOMATIC OUTPUT
◆ LOCATION INFORMATION OF
  DOCUMENT TO BE AUTOMATICALLY OUTPUT
  [                    ]

◆ IDENTIFICATION INFORMATION
  OF USER TERMINAL
  [                    ]

◆ COMMUNICATION CONNECTION METHOD
  [                    ]

◆ SET NOTIFICATION
  [                    ]

◆ PRINT OPTION INFORMATION
  [                    ]

◆ LIMIT FORMAT
  [                    ]

◆ TIME
  [                    ]

[ STORE ]  [ CANCEL ]
```

FIG. 10

| SET AUTOMATIC OUTPUT |
|---|
| ◆ LOCATION INFORMATION OF DOCUMENT TO BE AUTOMATICALLY OUTPUT |
| ◆ IDENTIFICATION INFORMATION OF IMAGE FORMING APPARATUS |
| ◆ COMMUNICATION CONNECTION METHOD |
| ◆ SET NOTIFICATION |
| ◆ PRINT OPTION INFORMATION |
| ◆ LIMIT FORMAT |
| ◆ TIME |
| ◆ IDENTIFICATION INFORMATION OF OTHER USER TERMINAL |
| STORE   CANCEL |

AUTOMATIC OUTPUT OF DOCUMENT

BACKGROUND

With advances in technology, various services which are based on communication connections between devices are emerging. As portable user terminals become widespread, an individual may use their portable terminal to communicate with another device or use a service provided by another device. Communication connections between devices may be performed directly or through a repeater such as a router.

BRIEF DESCRIPTION OF DRAWINGS

Various examples will be described below by referring to the following figures.

FIG. 6 illustrates a user interface for inputting setting information of an automatic document output function in an image forming apparatus according to an example.

FIG. 10 illustrates a user interface for inputting setting information of an automatic document output function in a user terminal according to an example.

DETAILED DESCRIPTION OF EXAMPLES

Figure 1:
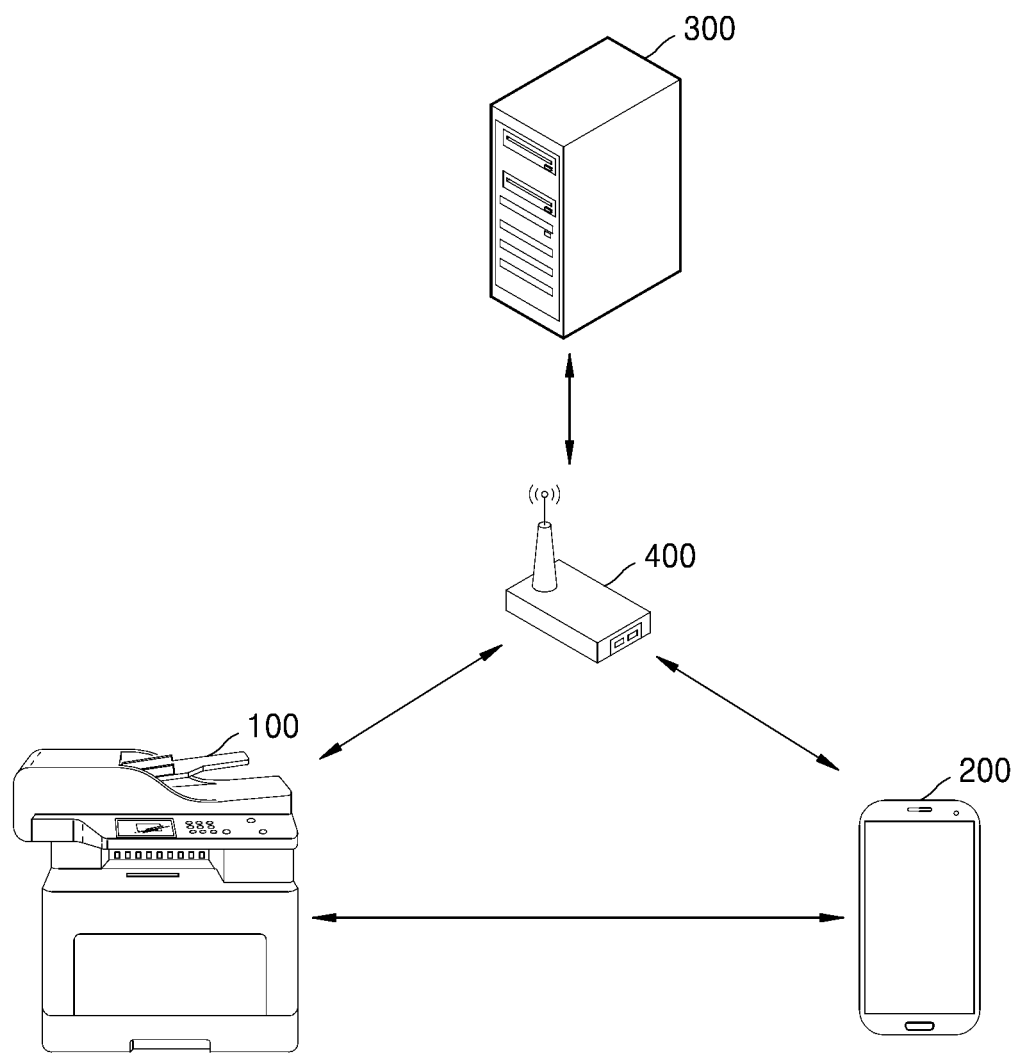
FIG. 1 is a diagram of a printing service environment according to an example.

Hereinafter, various examples will be described with reference to the drawings. Like reference numerals in the specification and the drawings denote like elements, and thus their descriptions will be omitted.

FIG. 1 is a diagram of a printing service environment according to an example.

Referring to FIG. 1, an image forming apparatus 100 generally refers to an apparatus capable of performing an image forming job, such as a printer, a copier, a scanner, a facsimile, a multifunction printer, etc. The image forming job may refer to any of various jobs related to an image, for example, printing, copying, scanning, faxing, or a related function, and may include a series of processes required for performing the image forming job.

A user terminal 200 generally refers to a device capable of transmitting a document, which is an image forming job target, or information about the document to the image forming apparatus 100. The user terminal 200 may include a mobile device such as a smartphone, a tablet, a notebook, etc.

A cloud server 300 may provide a cloud printing service, and, when there is a request of the image forming apparatus 100 or the user terminal 200, provide a response to the request. For example, when there is a request for the image forming job from the image forming apparatus 100 or the user terminal 200, the cloud server 300 may directly perform a process related to the requested image forming job or may allow the image forming apparatus 100 to perform the image forming job.

A router 400 may perform wired or wireless communication with external devices. The router 400 may be communicatively connected to a plurality of devices and may serve as a repeater to allow a communication connection between different external devices. As an example, the router 400 may be communicatively connected to the image forming apparatus 100, the user terminal 200, and the cloud server 300 and may serve as a repeater to allow a communication connection between any or all of those devices.

FIG. 1 illustrates the printing environment including the image forming apparatus 100, the user terminal 200, the cloud server 300, and the router 400, but is not limited thereto.

Figure 2:
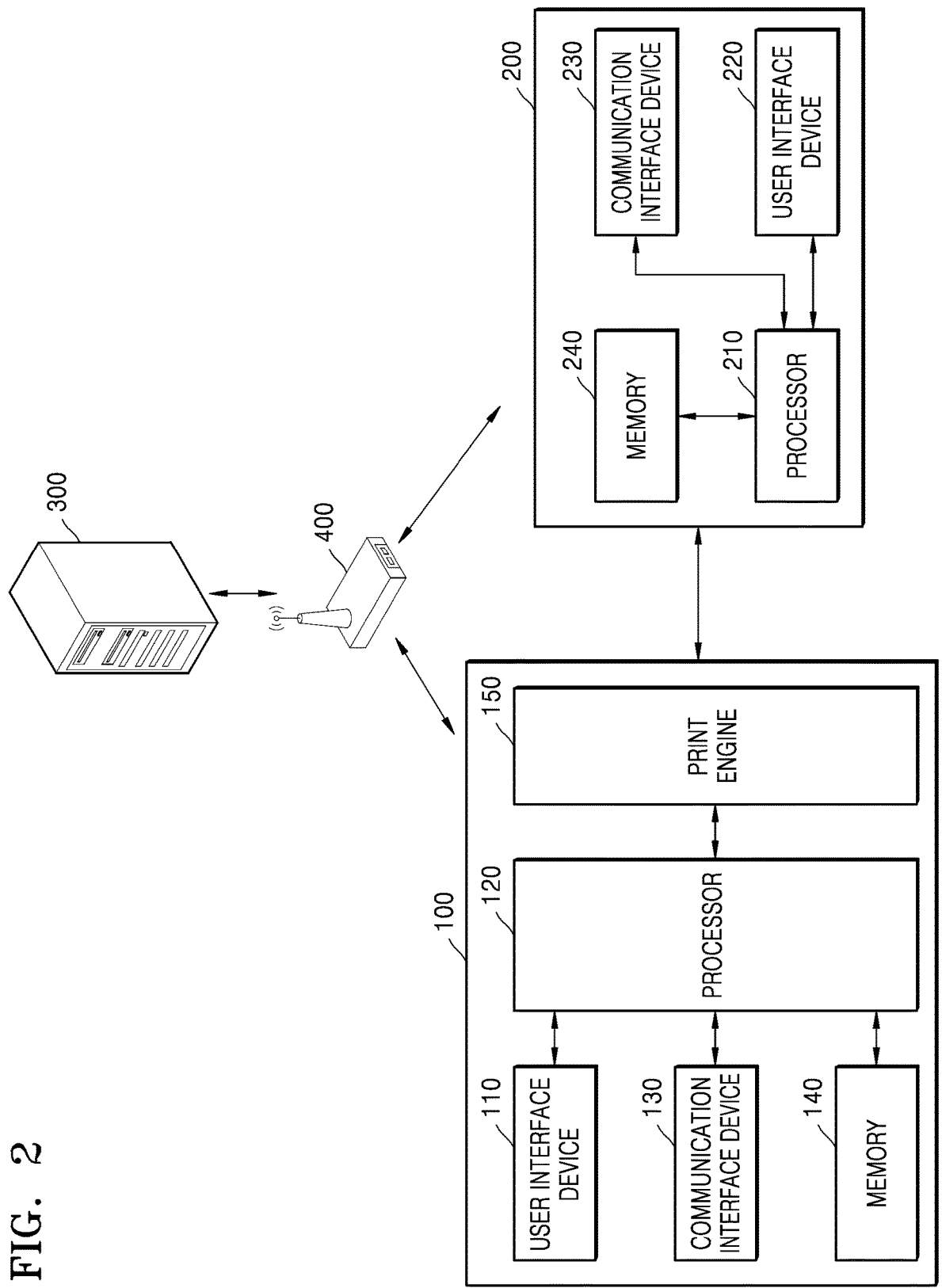
FIG. 2 is a diagram of an image forming apparatus and a user terminal according to an example.

FIG. 2 is a diagram of an image forming apparatus and a user terminal according to an example.

Referring to FIG. 2, the image forming apparatus 100 may include a user interface device 110, a processor 120, a communication interface device 130, a memory 140, and a print engine 150. In addition, although not shown, the image forming apparatus 100 may further include a power supply unit for supplying power to the respective components.

The user interface device 110 may include an input unit for receiving an input for performing an image forming job from a user, and an output unit for displaying information such as a result of performing the image forming job or the state of the image forming apparatus 100. For example, the user interface device 110 may include an operation panel for receiving a user input and a display panel for displaying a screen.

The input unit may include, for example, a device capable of receiving various types of user inputs such as a keyboard, a physical button, a touch screen, etc. The output unit may be, for example, the display panel. However, the disclosure is not limited thereto, and the user interface device 110 may include a device supporting various inputs/outputs.

The processor 120 may control an operation of the image forming apparatus 100 and may include at least one processor such as a central processing unit (CPU). The processor 120 may control other components included in the image forming apparatus 100 to perform an operation corresponding to the user input received through the user interface device 110. The processor 120 may include at least one specialized processor corresponding to each function or may be an integrated processor to perform each function. For example, the processor 120 may execute a program stored in the memory 140, read data or a file stored in the memory 140, or store a new file in the memory 140.

The communication interface device 130 may perform wired or wireless communication with another device or a network. To this end, the communication interface device 130 may include a communication module (e.g., a transceiver) supporting at least one of various wired or wireless communication methods. For example, the communication interface device 130 may support various wired or wireless communication methods such as wireless fidelity (Wi-Fi), Wi-Fi Direct, Bluetooth, Bluetooth Low Energy (BLE), Ultra Wide Band (UWB), Near Field Communication (NFC), Ethernet, etc.

The communication interface device 130 may be connected to an external device located outside the image forming apparatus 100 to transmit/receive a signal or data. The communication interface device 130 may transfer a signal or data received from the user terminal 200, the cloud server 300, or the router 400 to the processor 120 or transmit the signal or data generated by the processor 120 to the user terminal 200, the cloud server 300, or the router 400. The communication interface device 130 of the image forming apparatus 100 may transmit/receive a signal or data to/from a communication interface device 230 of the user terminal 200 through the cloud server 300.

The memory 140 may install and store various types of data including programs such as applications and files. The processor 120 may access and use data stored in the memory 140 or store new data in the memory 140. The processor 120 may execute a program installed in the memory 140. The processor 120 may install an application received from an external source through the communication interface device 130 in the memory 140. For example, the memory 140 may store a printing application that performs an automatic document output function.

The print engine 150 may perform an image forming job such as printing, copying, scanning, or faxing. The print engine 150 may include a printing unit, a scanning unit, and a faxing unit, and may include only some of these components as necessary, or may further include a component for performing another type of image forming job. The printing unit may form an image on a recording medium by using various printing methods such as an electrophotographic method, an inkjet method, a thermal transfer method, a thermal method, etc. The scanning unit may irradiate light onto a document, receive the reflected light, and read an image recorded on the document. In the faxing unit, a component for scanning an image may be shared with the scanning unit, and a component for printing a received file may be shared with the printing unit, and a scan file may be transmitted to a destination or a file may be received from the outside.

The user terminal 200 may include a processor 210, a user interface device 220, the communication interface device 230, and a memory 240.

The processor 210 may control an operation of the user terminal 200 and may include at least one processing unit. The processor 210 may control other components included in the user terminal 200 to perform an operation corresponding to a user input received through the user interface device 220. The processor 210 may include at least one specialized processor corresponding to each function or may be an integrated processor to perform each function. The processor 210 may execute a program stored in the memory 240, read data or a file stored in the memory 240, or store a new file in the memory 240.

The user interface device 220 may include an input unit for obtaining a user input and an output unit for providing information to a user. For example, the input unit may be an operation panel capable of receiving a user operation and a microphone for obtaining a speech of the user. The input unit may be a display panel for displaying a screen.

The user terminal 200 may be connected to an external apparatus such as the image forming apparatus 100 or the cloud server 300 through the communication interface device 230. For example, the communication interface device 230 may include a communication module capable of supporting at least one of various wired or wireless communication methods such as Wi-Fi, Wi-Fi Direct, Bluetooth, BLE, UWB, NFC, 3G, 4G, 5G, etc.

The memory 240 may store instructions executable by the processor 210. The memory 240 may install and store various types of data including programs such as applications and files. For example, the memory 240 may store a printing application that performs an automatic document output function.

In a printing service environment including the image forming apparatus 100 and the user terminal 200, the image forming apparatus 100 or the user terminal 200 may perform the automatic document output function. By performing the automatic document output function, when the user terminal 200 accesses the image forming apparatus 100, the image forming apparatus 100 may automatically output the document.

Automatically outputting the document may include printing the document or transmitting a stored file or a scanned file to another apparatus. Automatically outputting the document indicates that a file in a designated space is automatically output without a separate output command of the user even though the user manually selects the file and does not input the output command so as to output the document. The document may be one page or multiple pages.

That the user terminal 200 accesses the image forming apparatus 100 may indicate that the user terminal 200 is located within a range in which the user terminal 200 may communicate with the image forming apparatus 100 or that the user terminal 200 is located within a range in which the user terminal 200 may communicate with a repeater such as the router 400.

The printing application that performs the automatic document output function may be installed in the image forming apparatus 100 or the user terminal 200 and may be executed by the image forming apparatus 100 or the user terminal 200. The user may execute the printing application on the image forming apparatus 100 or the user terminal 200, input setting information regarding the automatic document output function, and perform the automatic document output function.

When the image forming apparatus 100 performs the automatic document output function, the processor 120 of the image forming apparatus 100 may execute instructions stored in the memory 140 to detect access of the predetermined user terminal 200 through the communication interface device 130 as the automatic document output function is performed. When detecting the access of the user terminal 200, the processor 120 may obtain a document to be automatically output based on the setting information of the automatic document output function. The processor 120 may output the obtained document by using the print engine 150.

When the user terminal 200 performs the automatic document output function, the processor 210 of the user terminal 200 may execute instructions stored in the memory 240 to detect access to the predetermined image forming apparatus 100 through the communication interface device 230 as the automatic document output function is performed. When detecting the access to the image forming apparatus 100, the processor 210 may obtain a document to be automatically output or information about the document to be automatically output based on the setting information of the automatic document output function. The processor 210 may transmit the obtained document to be automatically output or information about the document to be automatically output to the image forming apparatus 100 through the communication interface device 230. As described above, when the user terminal 200 supports an automatic document output by transmitting the document to be automatically output or the information about the document to be automatically output to the image forming apparatus 100, the image forming apparatus 100 may obtain the document to be automatically output and automatically output the obtained document.

Hereinafter, with reference to FIGS. 3 to 6, an example in which the image forming apparatus 100 performs an automatic document output function will be described, and with reference to FIGS. 7 to 10, an example in which the user terminal 200 performs an automatic document output function will be described.

Figure 3:
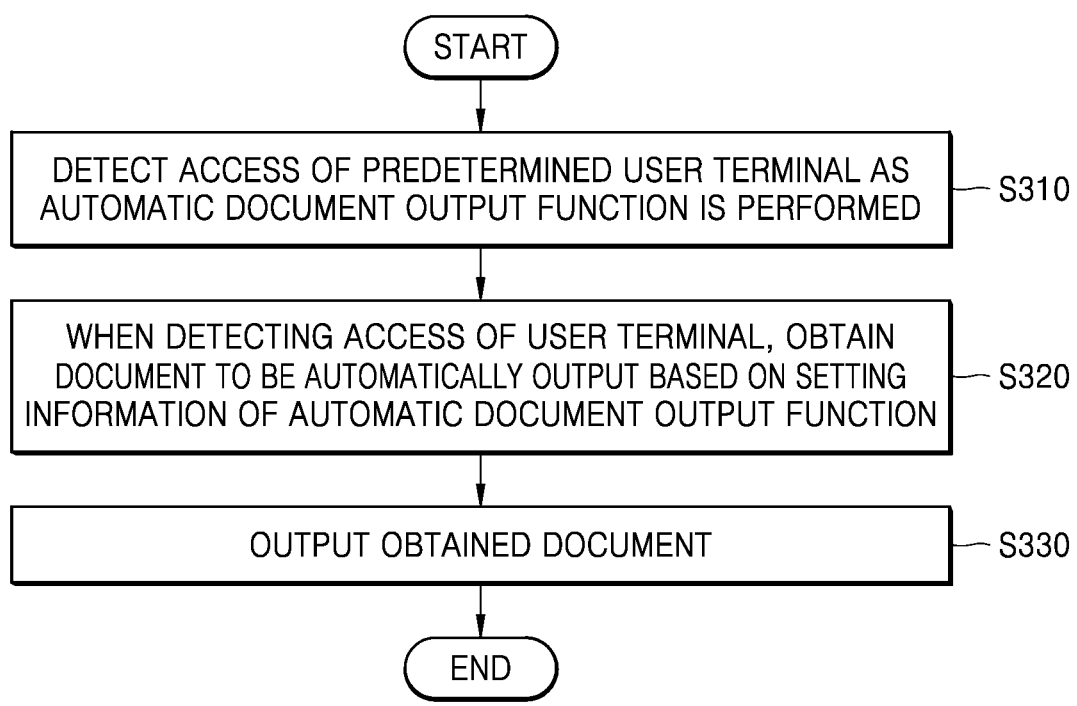
FIG. 3 is a flowchart of a method, performed by an image forming apparatus, of performing an automatic document output function according to an example.

FIG. 3 is a flowchart of a method, performed by an image forming apparatus, of performing an automatic document output function according to an example.

Referring to FIG. 3, the image forming apparatus 100 may detect access of the predetermined user terminal 200 as the automatic document output function is performed in operation S310. Even when a plurality of user terminals are located in a space in which the image forming apparatus 100 is located, the image forming apparatus 100 may detect the access of the predetermined user terminal 200 as the automatic document output function is performed. The image forming apparatus 100 may use the access of the predetermined user terminal 200 for the automatic document output even when a user has a plurality of user terminals or a plurality of users have their own user terminals.

In operation S320, when detecting the access of the user terminal 200, the image forming apparatus 100 may obtain a document to be automatically output based on setting information of the automatic document output function. The document to be automatically output may be obtained from a storage space that stores an automatic output file and is provided in any one of the image forming apparatus 100, the user terminal 200, the cloud server 300 that provides a cloud printing service to which the image forming apparatus 100 is connected, and the router 400 of a network to which the image forming apparatus 100 is connected. However, the device capable of storing the document to be automatically output is not limited thereto and may be a device having a function of transmitting, receiving, and storing a file, such as a File Transfer Protocol (FTP) function or a Server Message Block (SMB) function, such as a Network Access Server (NAS).

In operation S330, the image forming apparatus 100 may output the obtained document. A file corresponding to the output document may be deleted once the automatic output is performed, and may be used for reprinting. The image forming apparatus 100 may transmit an approval request message with respect to the automatic document output to the user terminal 200 through the communication interface device 130 and automatically output the obtained document by using the print engine 150 according to a user approval received in response to the transmission. Automatic output history information of the document may be transmitted to the user terminal 200 together with the approval request message with respect to the automatic document output.

Hereinafter, with reference to FIGS. 4 and 5, examples in which the image forming apparatus 100 performs an automatic document output according to a form of detecting access of the user terminal 200 will be described.

Figure 4:
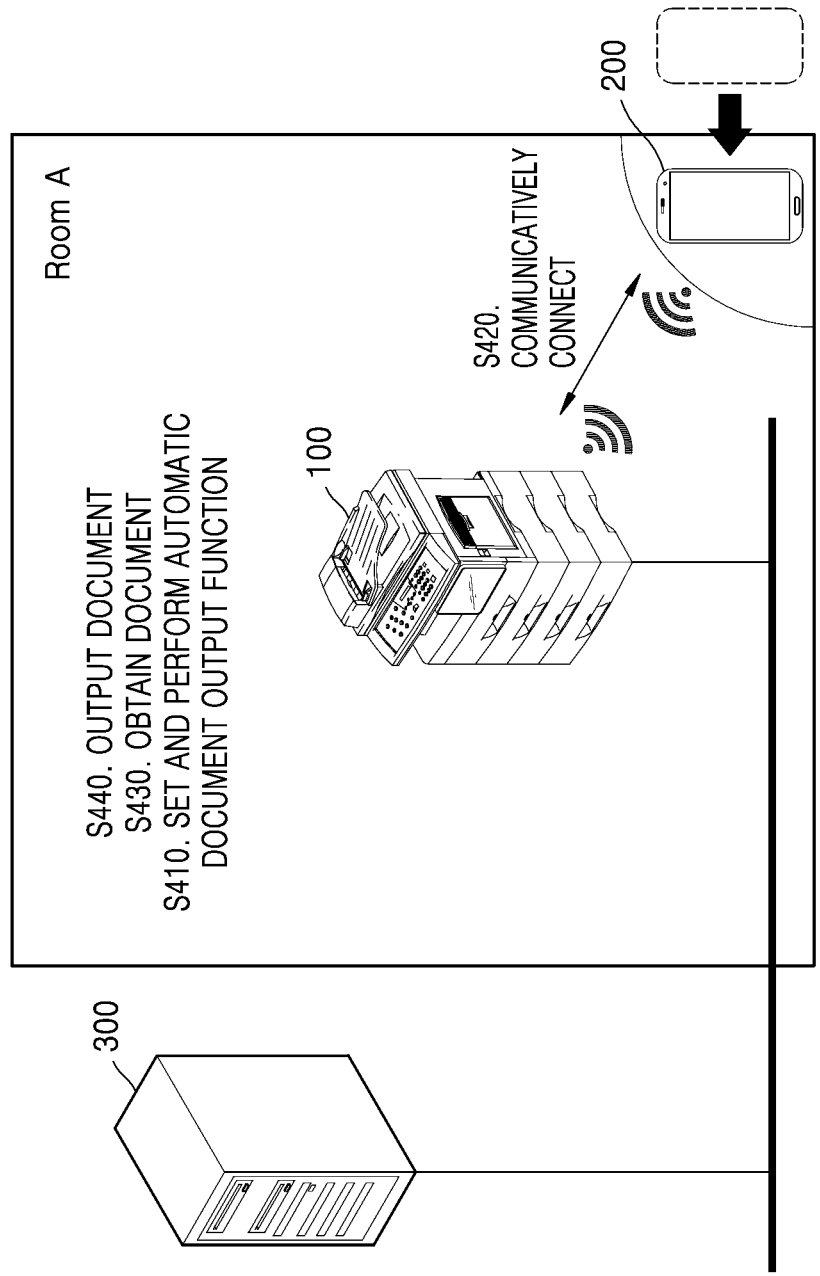
FIG. 4 is a diagram of a process in which an image forming apparatus performs an automatic document output based on a communication connection state with a user terminal according to an example.

FIG. 4 is a diagram of a process in which an image forming apparatus performs an automatic document output based on a communication connection state with a user terminal according to an example.

Referring to FIG. 4, the image forming apparatus 100 may set and perform an automatic document output function after receiving an input with respect to setting information of the automatic document output function through the user interface device 110 in operation S410.

The image forming apparatus 100 may detect access of the user terminal 200 based on the communication connection state with the user terminal 200 through the communication interface device 130 in operation S420. For example, when the communication interface device 130 of the image forming apparatus 100 is communicatively connected to the communication interface device 230 of the user terminal 200 according to a wireless communication method between devices such as Bluetooth, Wi-Fi Direct, NFC, etc., the image forming apparatus 100 may detect that the user terminal 200 has accessed the image forming apparatus 100. For example, when the user terminal 200 enters a Room A and when Bluetooth modules of the image forming apparatus 100 and the user terminal 200 are connected to each other, when Wi-Fi Direct modules thereof are connected to each other, or when NFC tagging is performed, the image forming apparatus 100 may detect that the user terminal 200 has accessed the image forming apparatus 100. When a communication connection is disconnected and an attempt is made to resume the communication connection between devices that have been communicatively connected to each other, or when the communication connection is available again through automatic authentication or the communication connection is set to be available again for a predetermined validity period, the communication connection may be available again without any input or action.

When detecting the access of the user terminal 200, the image forming apparatus 100 may obtain a document to be automatically output based on setting information of the automatic document output function in operation S430. Location information of the document to be automatically output included in the setting information of the automatic document output function may include a file name of the document to be automatically output, path information for accessing the file, etc.

The image forming apparatus 100 may output the obtained document by using the print engine 150 in operation S440.

Figure 5:
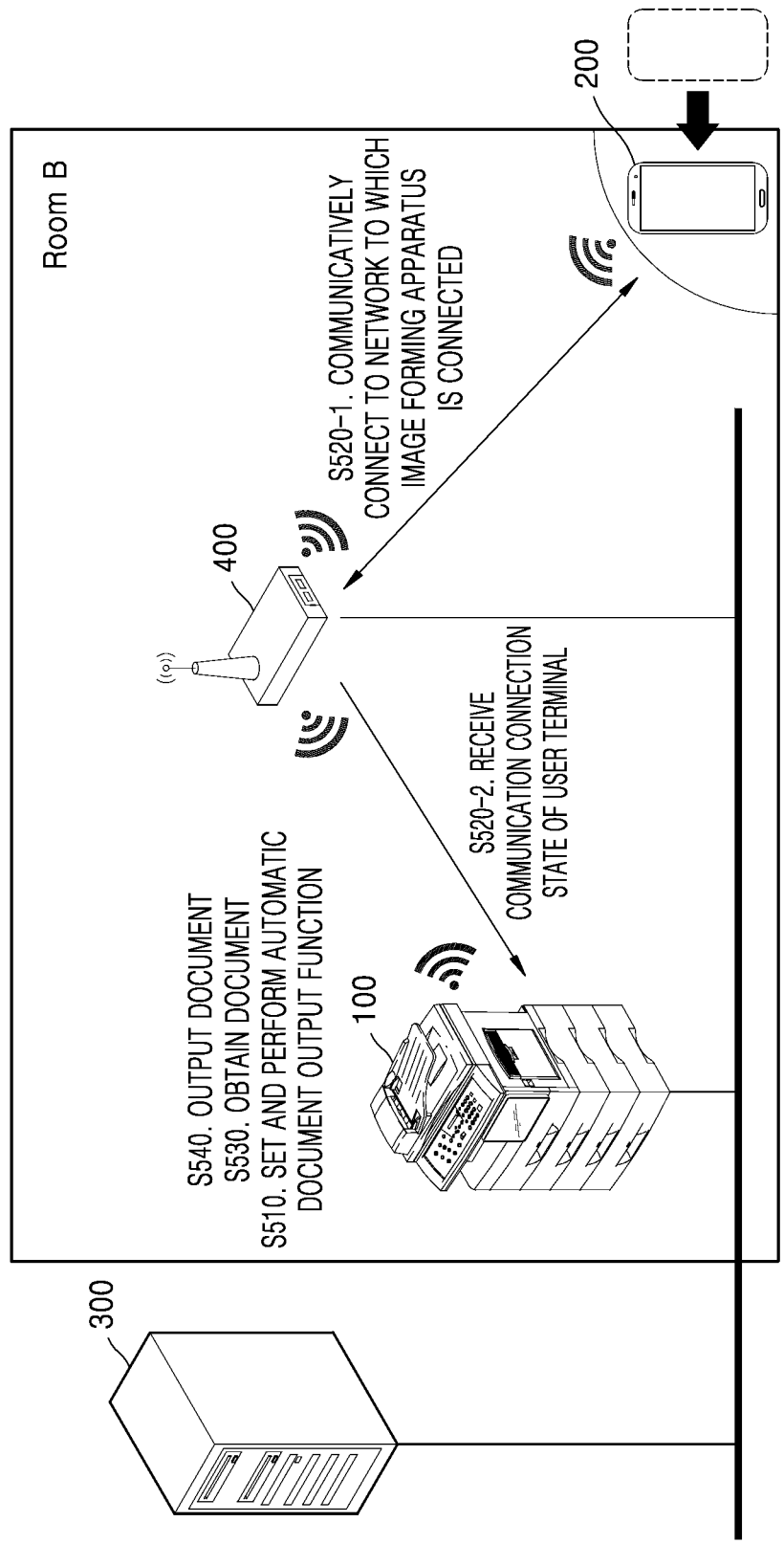
FIG. 5 is a diagram of a process in which an image forming apparatus performs an automatic document output based on a communication connection state of a user terminal with respect to a network to which the image forming apparatus is connected according to an example.

FIG. 5 is a diagram of a process in which an image forming apparatus performs an automatic document output based on a communication connection state of a user terminal with respect to a network to which the image forming apparatus is connected according to an example.

Referring to FIG. 5, the image forming apparatus 100 may set and perform an automatic document output function after receiving an input for setting information of the automatic document output function in operation S510.

As the user terminal 200 accesses the router 400 of the network to which the image forming apparatus 100 is connected, the user terminal 200 may be communicatively connected to the network to which the image forming apparatus 100 is connected in operation S520-1. For example, when the user terminal 200 enters a Room B in which the image forming apparatus 100 is located, the user terminal 200 may be communicatively connected to the network to which the image forming apparatus 100 is connected through the router 400.

The image forming apparatus 100 may receive, from the router 400, information about the communication connection state of the user terminal 200 with respect to the network to which the image forming apparatus 100 is connected through the communication interface device 130 in operation S520-2.

The image forming apparatus 100 may detect access of the user terminal 200 based on the communication connection state of the user terminal 200 with respect to the network to which the image forming apparatus 100 is connected which is received through the communication interface device 130 from the router 400 of the network to which the image forming apparatus 100 is connected. For example, in a state in which the communication interface device 130 of the image forming apparatus 100 is connected to the router 400 according to a wired or wireless communication method such as Wi-Fi or Ethernet, when the communication interface device 230 of the user terminal 200 is communicatively connected to the network to which the image forming apparatus 100 is connected, the image forming apparatus 100 may detect that the user terminal 200 has accessed the image forming apparatus 100 based on a signal received through the router 400. When a Wi-Fi module of the user terminal 200 is connected to a designated Service Set Identifier (SS ID) of the router 400 of the network to which the image forming apparatus 100 is connected or when the user terminal 200 is connected by wire through an Ethernet module, the image forming apparatus 100 may determine that the user terminal 200 accesses the image forming apparatus 100.

When detecting the access of the user terminal 200, the image forming apparatus 100 may obtain a document to be automatically output based on the setting information of the automatic document output function in operation S530.

The image forming apparatus 100 may output the obtained document by using the print engine 150 in operation S540.

FIG. 6 illustrates a user interface for inputting setting information of an automatic document output function in an image forming apparatus according to an example.

The image forming apparatus 100 may receive an input for setting information of the automatic document output function through the user interface device 110 to perform the automatic document output function.

Referring to FIG. 6, in order to set the automatic document output function, a user may input setting information such as location information of the document to be automatically output, identification information of the user terminal 200, a communication connection method of detecting the access of the user terminal 200, etc. through the user interface for inputting the setting information of the automatic document output function.

The location information of the document to be automatically output may include a storage space storing an automatic output file provided in any one of the image forming apparatus 100, the user terminal 200, the cloud server 300 providing a cloud printing service connected to the image forming apparatus 100, and the router 400 of a network to which the image forming apparatus 100 is connected. The location information of the document to be automatically output may include a file name of the document to be automatically output, path information for accessing the file, etc.

The identification information of the user terminal 200 may include unique information of the user terminal 200 that may distinguish the user terminal 200 from other external devices and may be a device identifier of the user terminal 200. As described above, by inputting the identification information of the user terminal 200, the image forming apparatus 100 may perform an automatic document output with respect to the access of the predetermined user terminal 200.

The communication connection method of detecting the access of the user terminal 200 may be any one of various wired or wireless communication methods of switching the communication connection state of the user terminal 200 from a disconnection state to a connection state as the user terminal 200 accesses the image forming apparatus 100. For example, the communication connection method may be a wired or wireless communication method using the wired/wireless router 400 such as Wi-Fi or Ethernet as well as a wireless communication method between devices such as Wi-Fi Direct, Bluetooth, etc.

As an additional option, the user may set whether to send a notification that may include an approval request message for the automatic document output to the user terminal 200 through a notification setting menu of the user interface for inputting the setting information of the automatic document output function.

The user may set print option information to be applied to the document to be automatically output through a print option information menu of the user interface for inputting the setting information of the automatic document output function. For example, the print option information may include whether the document to be automatically output is to be printed as a color output, whether the document to be automatically output is to be printed on both sides (e.g., double-sided printing) or a collective printing, a size of a print medium, etc. When the print option information is set, the user may also select whether to save the print option information together with the print data of the document to be automatically output as a single file or as separate files.

The user may set to limit a format of the document to be automatically output through a format limitation menu of the user interface for inputting the setting information of the automatic document output function. For example, the user may limit the format of the document to be automatically output to a print data format that may be directly output from the image forming apparatus 100 or may limit the format of the document to be automatically output by listing file extensions of documents that may be automatically output or documents that may not be automatically output.

The user may set a time for outputting the document to be automatically output through a time menu of the user interface for inputting the setting information of the automatic document output function. For example, the user may set the output time of the document to be automatically output such that the document to be automatically output is output immediately after being obtained or after a predetermined time has elapsed.

Figure 7:
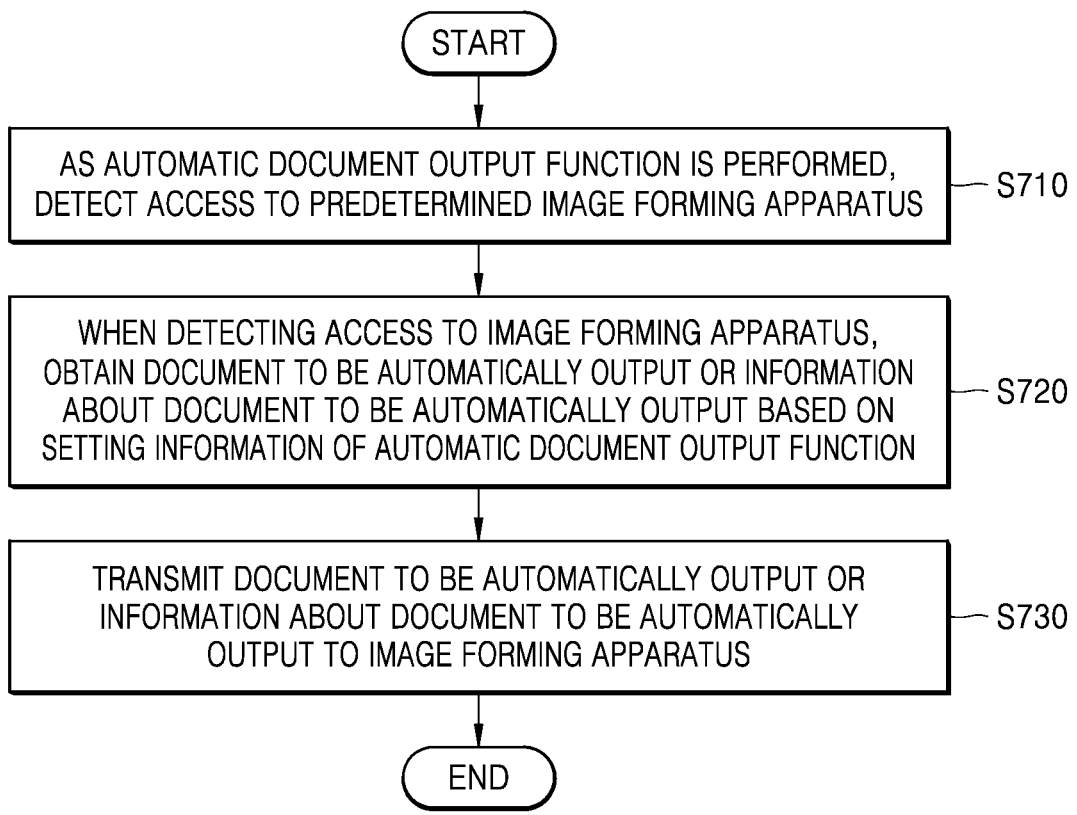
FIG. 7 is a flowchart illustrating a method, performed by a user terminal, of performing an automatic document output function according to an example.

FIG. 7 is a flowchart illustrating a method, performed by a user terminal, of performing an automatic document output function according to an example.

Referring to FIG. 7, as the automatic document output function is performed, the user terminal 200 may detect access to the predetermined image forming apparatus 100 in operation S710. Even when a plurality of image forming apparatuses 100 are located in the same space, the user terminal 200 may support the automatic document output by detecting the access to the predetermined image forming apparatus 100 as the automatic document outputting function is performed.

In operation S720, when detecting the access to the image forming apparatus 100, the user terminal 200 may obtain a document to be automatically output or information about the document to be automatically output based on setting information of the automatic document output function. The document to be automatically output may be obtained from a storage space storing an automatic output file provided in the user terminal 200. The information about the document to be automatically output may include location information of a storage space that stores the automatic output file and is provided in any one of the image forming apparatus 100, the cloud server 300 that provides a cloud printing service to which the image forming apparatus 100 is connected, and the router 400 of a network to which the image forming apparatus 100 is connected.

In operation S730, the user terminal 200 may transmit, to the image forming apparatus 100, the obtained document to be automatically output or information about the document to be automatically output. The user terminal 200 may display an approval request message with respect to the automatic document output through the user interface device 220, and according to a user approval input in response to such display, transmit the obtained document to be automatically output or the information about the document to be automatically output to the image forming apparatus 100 through the communication interface device 230. Automatic output history information of the document to be automatically output may be displayed on the user interface device 220 together with the approval request message with respect to the automatic document output.

Hereinafter, referring to FIGS. 8 and 9, examples in which the user terminal 200 supports an automatic document output according to a form of detecting access to the image forming apparatus 100 will be described.

Figure 8:
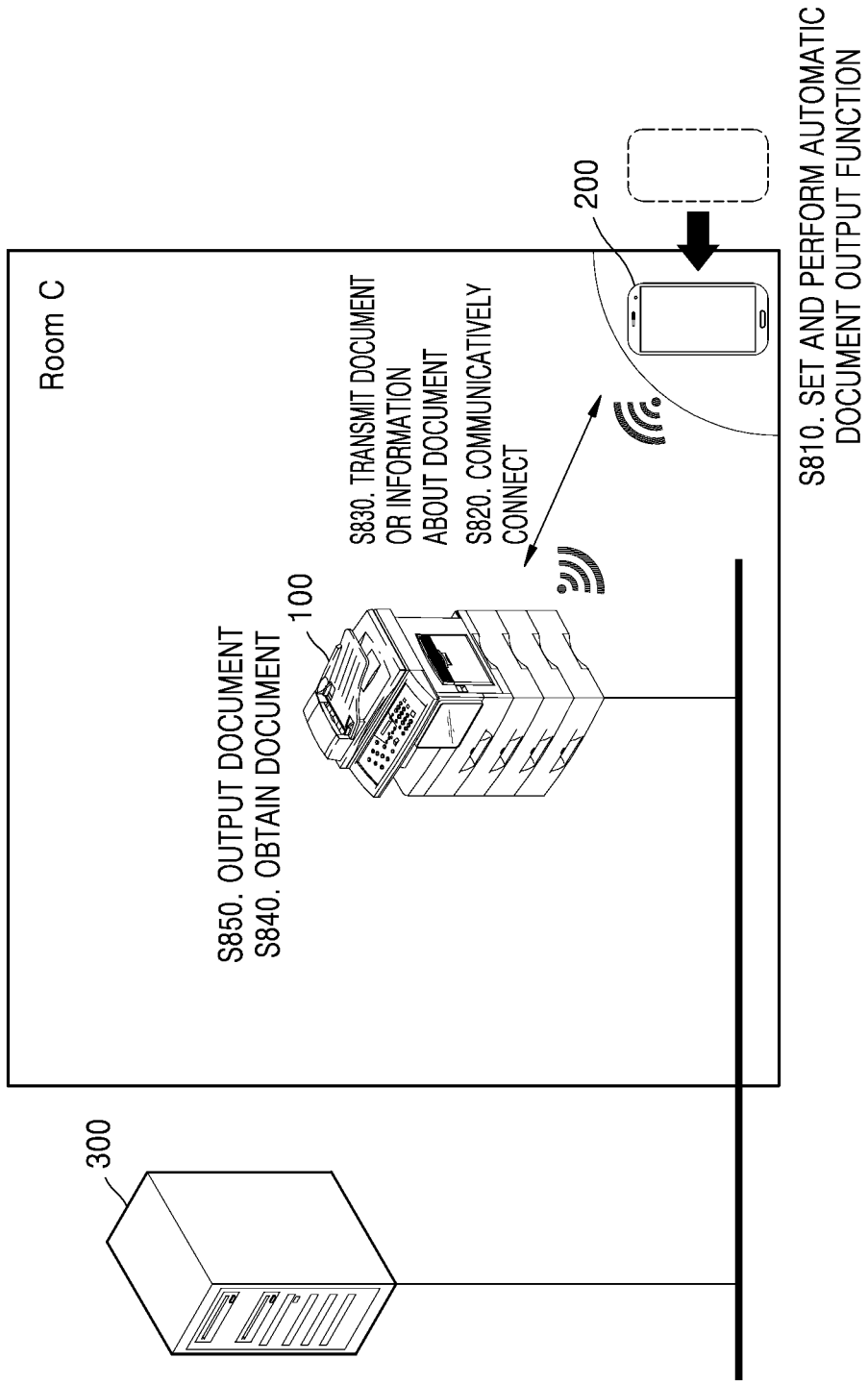
FIG. 8 is a diagram of a process in which a user terminal supports an automatic document output based on a communication connection state with an image forming apparatus according to an example.

FIG. 8 is a diagram of a process in which a user terminal supports an automatic document output based on a communication connection state with an image forming apparatus according to an example.

Referring to FIG. 8, the user terminal 200 may set and perform an automatic document output function after receiving an input with respect to setting information of the automatic document output function through the user interface device 220 in operation S810.

The user terminal 200 may detect access to the image forming apparatus 100 based on the communication connection state with the image forming apparatus 100 through the communication interface device 230 in operation S820. For example, when the user terminal 200 enters a Room C in which the image forming apparatus 100 is located and the communication interface device 230 of the user terminal 200 is communicatively connected to the communication interface device 130 of the image forming apparatus 100 according to a wireless communication method between devices such as Bluetooth, Wi-Fi Direct, NFC, etc., the user terminal 200 may detect that the user terminal 200 has accessed the image forming apparatus 100.

When detecting the access to the image forming apparatus 100, based on the setting information of the automatic document output function, the user terminal 200 may obtain a document to be automatically output or information about the document to be automatically output and transmit the document to be automatically output or the information about the document to be automatically output to the image forming apparatus 100 through the communication interface device 230 in operation S830.

The image forming apparatus 100 may obtain the document to be automatically output based on receiving the document to be automatically output or the information about the document to be automatically output which is transmitted from the user terminal 200 in operation S840. The information about the document to be automatically output transmitted from the user terminal 200 may include location information of the document to be automatically output.

The image forming apparatus 100 may output the obtained document by using the print engine 150 in operation S850.

Figure 9:
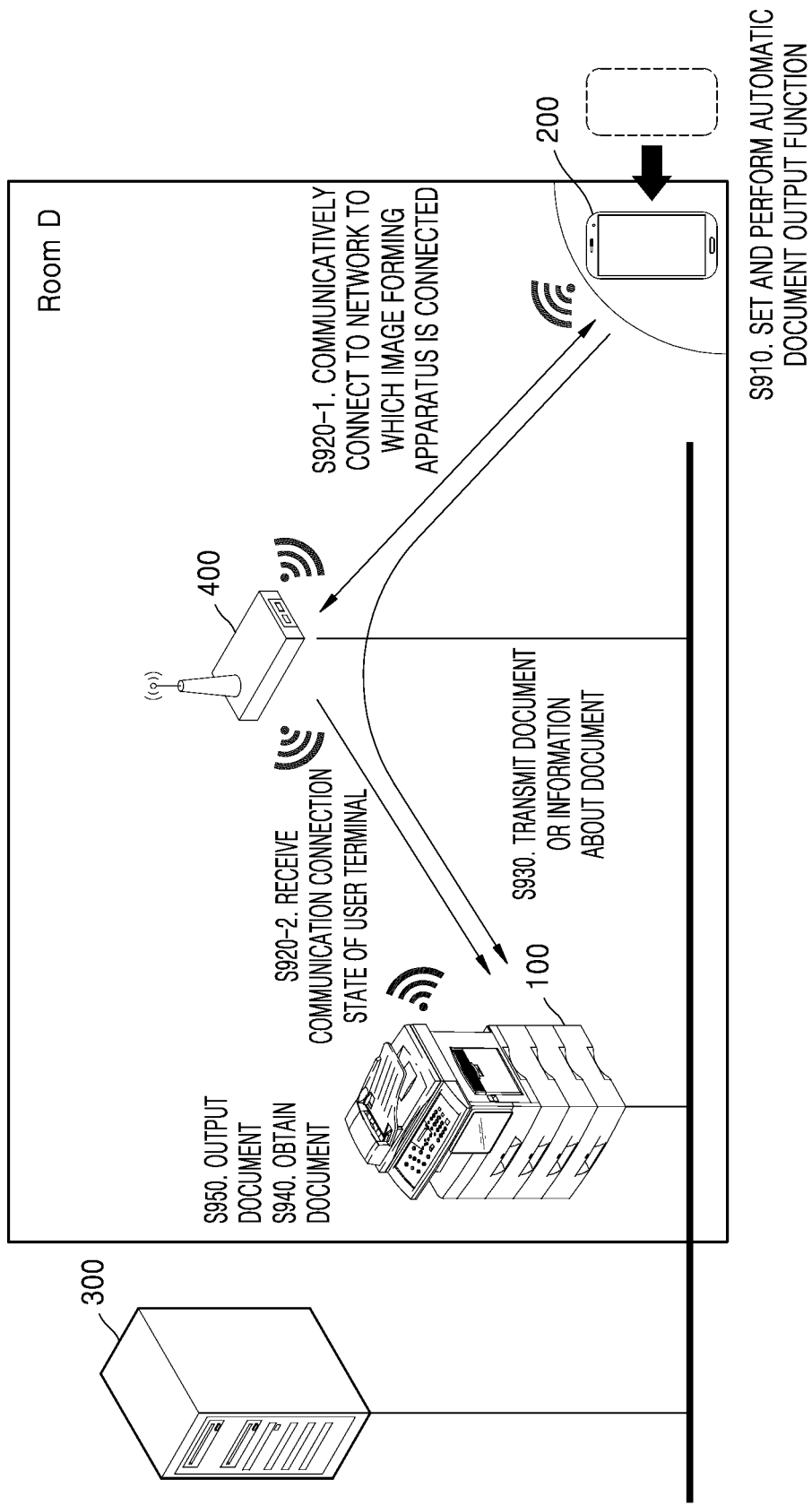
FIG. 9 is a diagram of a process in which a user terminal supports an automatic document output based on a communication connection state of the user terminal with respect to a network to which an image forming apparatus is connected according to an example.

FIG. 9 is a diagram of a process in which a user terminal supports an automatic document output based on a communication connection state of a user terminal with respect to a network to which the image forming apparatus is connected according to an example.

Referring to FIG. 9, the user terminal 200 may set and execute an automatic document output function after receiving an input for setting information of the automatic document output function through the user interface device 220 in operation S910.

As the user terminal 200 accesses the router 400 of the network to which the image forming apparatus 100 is connected, the user terminal 200 may be communicatively connected to the network to which the image forming apparatus 100 is connected in operation S920-1. For example, when the user terminal 200 enters a Room D in which the router 400 of the network to which the image forming apparatus 100 is connected is located, the user terminal 200 may be communicatively connected to the network to which the image forming apparatus 100 is connected.

The user terminal 200 may detect access to the image forming apparatus 100 based on a communication connection state with the router 400 of the network to which the image forming apparatus 100 is connected through the communication interface device 230. For example, in a state in which the communication interface device 130 of the image forming apparatus 100 is connected to the router 400 according to a wired or wireless communication method such as Wi-Fi or Ethernet, when the communication interface device 230 of the user terminal 200 is communicatively connected to the network to which the image forming apparatus 100 is connected, the user terminal 200 may detect that the user terminal 200 has accessed the image forming apparatus 100.

The image forming apparatus 100 may receive, from the router 400, information about the communication connection state of the user terminal 200 with respect to the network to which the image forming apparatus 100 is connected through the communication interface device 130 in operation S920-2.

When detecting the access to the image forming apparatus 100, based on the setting information of the automatic document output function, the user terminal 200 may obtain a document to be automatically output or information about the document to be automatically output and transmit the document to be automatically output or the information about the document to be automatically output to the image forming apparatus 100 through the communication interface device 230 in operation S930.

The image forming apparatus 100 may obtain the document to be automatically output based on receiving the document to be automatically output or the information about the document to be automatically output which is transmitted from the user terminal 200 in operation S940.

The image forming apparatus 100 may output the obtained document by using the print engine 150 in operation S950.

FIG. 10 illustrates a user interface for inputting setting information of an automatic document output function in a user terminal according to an example. Descriptions that may be redundant to those described in FIG. 6 will be omitted.

The user terminal 200 may receive an input for setting information of the automatic document output function through the user interface device 220 to perform the automatic document output function.

Referring to FIG. 10, in order to set the automatic document output function, a user may input setting information such as location information of the document to be automatically output, identification information of the image forming apparatus 100, a communication connection method of detecting the access to the image forming apparatus 100, etc. through the user interface for inputting the setting information of the automatic document output function.

The location information of the document to be automatically output may include a storage space storing an automatic output file provided in any one of the image forming apparatus 100, the user terminal 200, the cloud server 300 providing a cloud printing service connected to the image forming apparatus 100, and the router 400 of a network to which the image forming apparatus 100 is connected. The location information of the document to be automatically output may include a file name of the document to be automatically output, path information for accessing the file, etc.

The identification information of the image forming apparatus 100 may include unique information of the image forming apparatus 100 that may distinguish the image forming apparatus 100 from other external devices and may be a device identifier of the image forming apparatus 100. When a plurality of image forming apparatuses 100 are located in the same space, the user terminal 200 may support the automatic document output with respect to the access to the predetermined image forming apparatus 100 by inputting the identification information of the image forming apparatus 100.

The communication connection method of detecting the access to the image forming apparatus 100 may be any one of various wired or wireless communication methods of switching the communication connection state of the user terminal 200 from a disconnection state to a connection state as the user terminal 200 accesses the image forming apparatus 100. For example, the communication connection method may be a wired or wireless communication method using the wired/wireless router 400 such as Wi-Fi or Ethernet as well as a wireless communication method between devices such as Wi-Fi Direct, Bluetooth, etc.

As an additional option, the user may set whether to display a notification that may include an approval request message for the automatic document output through the user interface device 220 through a notification setting menu of the user interface for inputting the setting information of the automatic document output function.

The user may set print option information to be applied to the document to be automatically output through a print option information menu of the user interface for inputting the setting information of the automatic document output function.

The user may set to limit a format of the document to be automatically output through a format limitation menu of the user interface for inputting the setting information of the automatic document output function.

The user may set a time for outputting the document to be automatically output through a time menu of the user interface for inputting the setting information of the automatic document output function.

When a user terminal of another person accesses the image forming apparatus 100, the user may set to support the automatic document output through an identification information menu of the other user terminal of the user interface for inputting the setting information of the automatic document output function. When the user supports the automatic document output to the user terminal 200 of the user, even though the user does not input the identification information of the user terminal 200 separately, because the identification information of the user terminal 200 is stored in the user terminal 200, the user may support the automatic document output by using the user terminal 200. However, when the user sets the automatic document output function with respect to the other user terminal in the user terminal 200 of the user instead, the user may input identification information of the other user terminal in an identification information menu of the other user terminal.

When the setting information of the automatic document output function includes identification information of the other user terminal, the user terminal 200 may transmit the setting information of the automatic document output function and an approval request message with respect to the setting of the automatic document output function to the other user terminal through the communication interface device 230. When a printing application for performing the automatic document output function is not installed in the other user terminal, information used for installing the printing application may be provided to the other user terminal.

The other user terminal may set the automatic document output function according to the setting information of the automatic document output function received from the user terminal 200 or set the automatic document output function by changing the setting information of the automatic document output function. According to this, when a user terminal 'MB' of a user 'B', other than a user terminal 'MA' of a user 'A', accesses the image forming apparatus 100, the image forming apparatus 100 may instead set automatic output of a document. However, the user terminal 'MA' of the user 'A' may transmit the setting information of the automatic document output function and the approval request message with respect to the setting of the automatic document output function to the user terminal 'MB' of the user 'B' and support the automatic document output according to the setting when the user 'B' approves the setting of the automatic document output function through the user terminal 'MB'.

By utilizing the automatic document output function described above, when a user having the predetermined user terminal 200 moves to a space in which the predetermined image forming apparatus 100 is located, a document may be automatically output according to preset information without a separate printing command, thereby saving time and effort of the user for outputting the document. As an example, when a user who frequently moves needs to print and use a document that is repeatedly used due to the nature of work or a document of a specific form every time the user returns to a work space, by using the automatic document output function described above, the work environment may be improved and the work efficiency may increase.

The description above may be in part or completely implemented by a non-transitory computer-readable storage medium storing instructions or data executable by a computer or a processor. The examples may be written as computer programs and may be implemented in general-use digital computers that execute the programs by using a non-transitory computer-readable storage medium. Examples of the non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-status disks (SSDs), and instructions or software, associated data, data files, and data structures, and any device capable of providing instructions or software, associated data, data files, and data structures to a processor or a computer such that the processor or computer may execute instructions.

What is claimed is:

1. An image forming apparatus comprising:
   a communication interface device;
   a print engine;
   a processor; and
   a memory storing instructions executable by the processor,
   wherein the processor, by executing the instructions as an automatic document output function is performed, is to:
   detect access of a predetermined user terminal through the communication interface device,
   based on detecting the access of the predetermined user terminal, obtain a document to be automatically output using setting information of the automatic document output function,
   based on the setting information, determine a set time for outputting the document, wherein:
       in response to the set time being immediately after the document is obtained, set the document to be automatically output immediately after being obtained, and
       in response to the set time being after a predetermined time after the document is obtained, set the document to be automatically output after the predetermined time has elapsed, and
   output the obtained document by using the print engine.

2. The image forming apparatus of claim 1, wherein the processor is further to detect the access of the predetermined user terminal based on a communication connection state with the predetermined user terminal through the communication interface device.

3. The image forming apparatus of claim 1, wherein the processor is further to detect the access of the predetermined user terminal based on a communication connection state of the predetermined user terminal with respect to a network to which the image forming apparatus is connected and received through the communication interface device from a router of the network.

4. The image forming apparatus of claim 1, wherein the document to be automatically output is obtained from a storage space that stores an automatic output file and is provided in one of the image forming apparatus, the predetermined user terminal, a cloud server that provides a cloud printing service to which the image forming apparatus is connected, or a router of a network to which the image forming apparatus is connected.

5. The image forming apparatus of claim 1, further comprising a user interface device,
   wherein the processor is further to perform the automatic document output function after receiving an input with respect to setting information of the automatic document output function through the user interface device.

6. The image forming apparatus of claim 5, wherein the setting information of the automatic document output function comprises location information of the document to be automatically output, identification information of the predetermined user terminal, or a communication connection method of detecting access of the predetermined user terminal.

7. The image forming apparatus of claim 1, wherein the processor is further to:
   transmit an approval request message for an automatic document output to the predetermined user terminal through the communication interface device, and
   output the obtained document by using the print engine according to a user approval received in response to the transmission.

8. A user terminal comprising:
   a communication interface device;
   a processor; and
   a memory storing instructions executable by the processor,
   wherein the processor, by executing the instructions as an automatic document output function is performed, is to:
   detect access to a predetermined image forming apparatus through the communication interface device,
   based on detecting the access to the predetermined image forming apparatus, obtain a document to be automatically output or information about the document to be automatically output using setting information of the automatic document output function,
   based on the setting information, determine a set time for outputting the document or the information about the document, wherein:
       in response to the set time being immediately after the document to be automatically output or the information about the document to be automatically output is obtained, set the document to be automatically output or the information about the document to be automatically output immediately after being obtained, and
       in response to the set time being after a predetermined time after the document to be automatically output or the information about the document to be automatically output is obtained, set the document to be automatically output or the information about the document to be automatically output after the predetermined time has elapsed, and
   transmit the obtained document to be automatically output or the information about the document to be automatically output and the setting information to the predetermined image forming apparatus through the communication interface device.

9. The user terminal of claim 8, wherein the processor is further to detect the access to the predetermined image forming apparatus based on a communication connection state with the predetermined image forming apparatus through the communication interface device.

10. The user terminal of claim 8, wherein the processor is further to detect the access to the predetermined image forming apparatus based on a communication connection state with a router of a network to which the predetermined image forming apparatus is connected through the communication interface device.

11. The user terminal of claim 8,
wherein the document to be automatically output is obtained from a storage space that stores an automatic output file and is provided in the user terminal, and
wherein the information about the document to be automatically output is obtained from a storage space that stores an automatic output file and is provided in one of the predetermined image forming apparatus, a cloud server that provides a cloud printing service to which the predetermined image forming apparatus is connected, or a router of a network to which the predetermined image forming apparatus is connected.

12. The user terminal of claim 8, further comprising a user interface device,
wherein the processor is further to perform the automatic document output function after receiving an input with respect to setting information of the automatic document output function through the user interface device.

13. The user terminal of claim 12, wherein the setting information of the automatic document output function comprises location information of the document to be automatically output, identification information of the predetermined image forming apparatus, or a communication connection method of detecting access to the predetermined image forming apparatus.

14. The user terminal of claim 12, wherein, when the setting information of the automatic document output function comprises identification information of another user terminal, the user terminal is to transmit the setting information of the automatic document output function and an approval request message with respect to setting of the automatic document output function to the other user terminal through the communication interface device.

15. The user terminal of claim 8, further comprising a user interface device,
wherein the processor is further to:
display an approval request message for an automatic document output through the user interface device, and
according to a user approval input in response to the display, transmit the obtained document to be automatically output or information about the document to be automatically output to the predetermined image forming apparatus through the communication interface device.

16. The image forming apparatus of claim 7, wherein the processor is further to:
transmit automatic output history information of the automatic document with the approval request message.

\* \* \* \* \*